United States Patent
Camps Claramunt et al.

(10) Patent No.: US 8,388,194 B2
(45) Date of Patent: Mar. 5, 2013

(54) CHAMBER FOR LASER APPARATUS WITH EXTRUDED BASE FRAME

(75) Inventors: Joan Camps Claramunt, Barcelona (ES); Francesc Bravo Montero, Barcelona (ES); Sven Alexander Vogler, Barcelona (ES); Valentí Boira Plans, Barcelona (ES)

(73) Assignee: Macsa ID, S.A., Barcelona (ES)

( * ) Notice: Subject to any disclaimer, the term of this patent is extended or adjusted under 35 U.S.C. 154(b) by 470 days.

(21) Appl. No.: 12/696,734

(22) Filed: Jan. 29, 2010

(65) Prior Publication Data
US 2010/0202148 A1   Aug. 12, 2010

(30) Foreign Application Priority Data
Feb. 2, 2009 (ES) .................................. 200900335

(51) Int. Cl.
*F21V 15/00* (2006.01)
(52) U.S. Cl. ....................................................... 362/362
(58) Field of Classification Search .................. 362/362
See application file for complete search history.

(56) References Cited

U.S. PATENT DOCUMENTS

| | | | | |
|---|---|---|---|---|
| 5,404,001 A | * | 4/1995 | Bard et al. | 235/462.33 |
| 5,471,952 A | * | 12/1995 | Tsuchiya | 119/267 |
| 5,748,656 A | | 5/1998 | Watson et al. | |
| 6,021,150 A | | 2/2000 | Partio et al. | |
| 2004/0114647 A1 | * | 6/2004 | Sukhman et al. | 372/36 |
| 2007/0109783 A1 | * | 5/2007 | Wilson et al. | 362/259 |
| 2008/0175281 A1 | * | 7/2008 | Nakamura | 372/20 |

FOREIGN PATENT DOCUMENTS

| | | |
|---|---|---|
| EP | 0820132 A2 | 1/1998 |
| JP | 6-069567 A | 3/1994 |
| JP | 2001-053361 A | 2/2001 |

OTHER PUBLICATIONS

Spanish Search Report dated Jul. 20, 2009.

* cited by examiner

*Primary Examiner* — Anh Mai
*Assistant Examiner* — Hana Featherly
(74) *Attorney, Agent, or Firm* — RatnerPrestia

(57) ABSTRACT

A laser apparatus includes a base frame extruded in one single piece of light alloy metal which determines a chamber intended to receive the laser generator cavity, incorporated within the chamber. The plane of the lower base of the chamber coincides with the base plane of the extruded base, and the lateral faces of the chamber are directed towards opposed lateral faces of partition walls of the extruded base, with controlled clearance to permit the expansion of the laser generator cavity without mechanical stresses being produced on same, capable of deforming it.

12 Claims, 5 Drawing Sheets

CHAMBER FOR LASER APPARATUS WITH EXTRUDED BASE FRAME

FIELD

The present invention relates to a laser apparatus which has simple features and which is intended for different applications, including equivalents to those performed by ink-jet equipment.

BACKGROUND

The laser apparatuses known at present have a complex structure and a high price. This limits their application and extension to certain fields in which costs are decisive.

SUMMARY

In order to solve this problem, the inventors have proposed to provide a laser apparatus which has simple features as a result of its structure, which facilitates the manufacture of the laser system as well as its installation and maintenance. Provision was also made that owing to its construction, any damage to the laser if it should occur can be repaired without the need to send components to third parties. Also, the overall dimensions will be smaller compared with known laser apparatuses, thereby facilitating its placement in production lines.

The laser apparatus of the present invention has a main base made of extruded aluminium, with the aim that with a single extruded part it is possible to mount the laser generator, as well as its electronic assemblies and optics of the system, etc., reducing the mechanical components for attachment and adjustment.

The laser generator is formed by a laser cavity incorporated directly on the extruded base in a chamber of the latter, with the aid of lateral and base spacer elements in order to permit mounting in such a way as to allow expansion differences between the cavity and the extruded support without generating mechanical stresses on the cavity, which could alter the functioning of the latter.

The structure of the apparatus allows the laser cavity to be placed at the same level as, or at a level very close to, the mounting surface of the equipment, thereby making it possible to vary the working distance of the laser system, avoiding expensive solutions such as periscopes, ball and socket joints, articulated optics, etc. At the same time the need to use mirrors and their supports, or other optical systems for forming the optical path between the outlet mirror of the laser cavity and the lens for focusing the beam, is eliminated.

Other features of the laser apparatus of the present invention comprise the increase in the heat-radiating surfaces, since the mechanical base or support of the equipment is formed by a single extruded light alloy part, with intermediate partition wall for delimiting the chamber in which the laser generator device cavity is fitted, permitting a considerable increase in the heat-radiating surfaces.

Owing to its construction, the apparatus permits different options, for example: an item of equipment consisting of a single piece with all the components incorporated in a single volume which includes the user interface and which may have the possibility of marking between 0° and 90°, but there will also be the option of a split unit with the laser assembly and scanners in a first block installed in the production line, and a second block which could be placed in the user interface and the supply and control electronics. In this version the equipment would allow the dimensions of the tube to be smaller than in the one-piece option.

With the new laser apparatus an apparatus is obtained which is solid and stable, mechanically as well as thermally and electrically, so that marking and coding are reliable, ensuring the marking of all the products on a line and ensuring the quality of the marking and coding.

The structuring of the apparatus by means of the extruded base as the main support allows the placing of the different electronic assemblies insulated by means of metal walls which prevent disturbances of the RF source and, as can be seen, allow electrical lead-throughs.

The present description refers specifically to the one-piece option.

BRIEF DESCRIPTION OF THE DRAWINGS

For greater understanding thereof, drawings of a preferred embodiment are appended by way of example, it being understood that this is in no way limiting and that the apparatus may include numerous different embodiments without departing from the fundamental features which will be explained and defined in the claims.

In the drawings.

DETAILED DESCRIPTION

Figure 1:
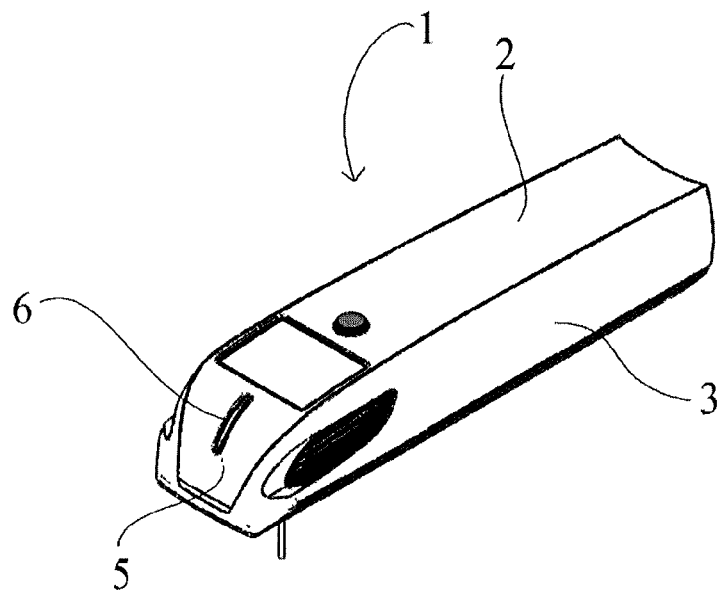
FIG. 1 shows a perspective view of a laser apparatus according to the invention.

FIG. 1 shows an external view in perspective of the apparatus in which can basically be seen the upper lid, made of plastics material, indicated generally by the number 1 and which by way of example has a prism-shaped structure with an upper wall 2 and side walls 3 and 4, and also the front face 5 equipped with a possible outlet groove 6.

Figure 2:
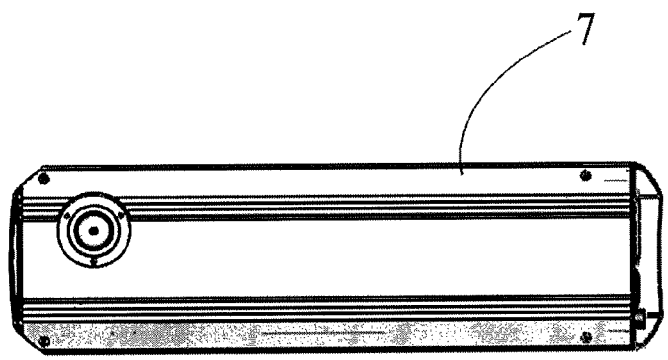
FIGS. 2, 3 and 4 show respectively a view from below, a side elevation view and a plan view.
Figure 3:
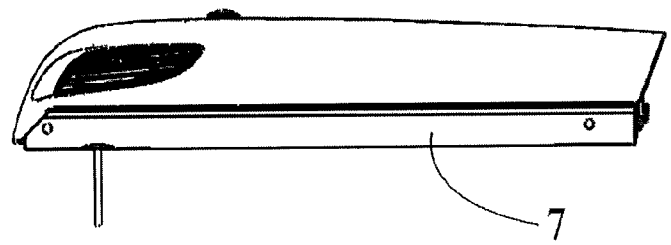
Figure 4:
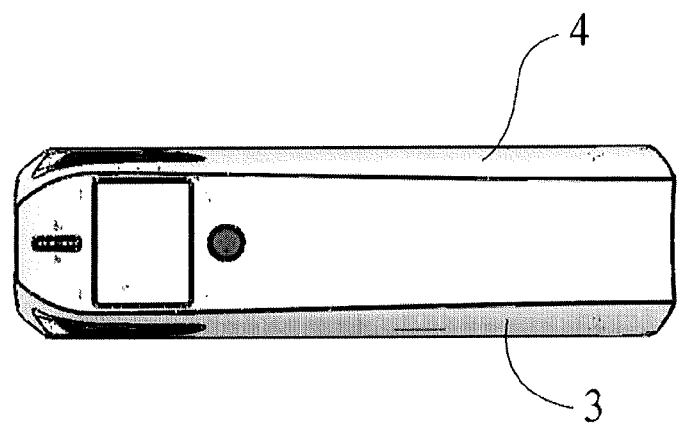
Figure 5:
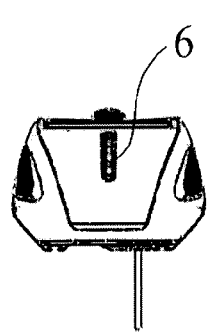
FIGS. 5 and 6 respectively show front and rear elevation views.

The apparatus has an extruded support base which is the basic part of the support body or underframe of the apparatus, which has been designated by the number 7, and is visible in FIGS. 2 and 3.

Figure 6:
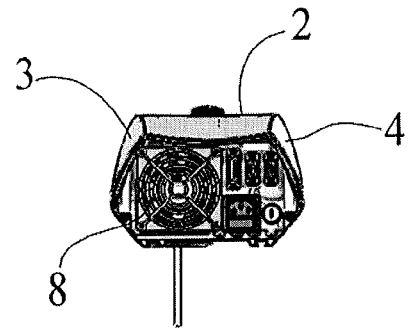

In FIG. 6 can be seen a elevation view of the rear face of the apparatus, in which the outlet of the fan 8 and electrical connections can be seen.

Figure 7:
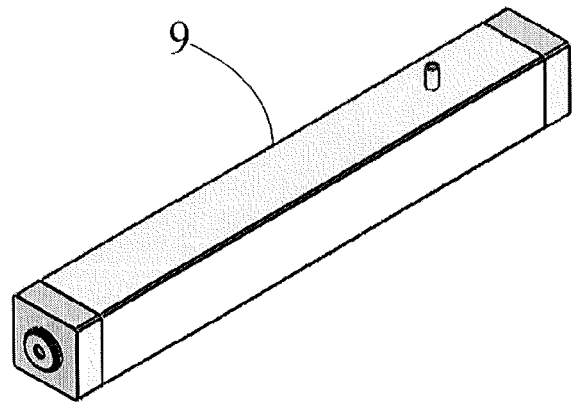
FIG. 7 shows a perspective view of the laser generator cavity.

FIG. 7 shows a perspective view of the laser generator cavity, which has been designated by the number 9. Said cavity contains the laser core and in the example shown it is prism-shaped in structure, substantially square, forming an independent assembly that can be coupled to the base 7 of the apparatus as will be explained hereinafter.

Figure 8:
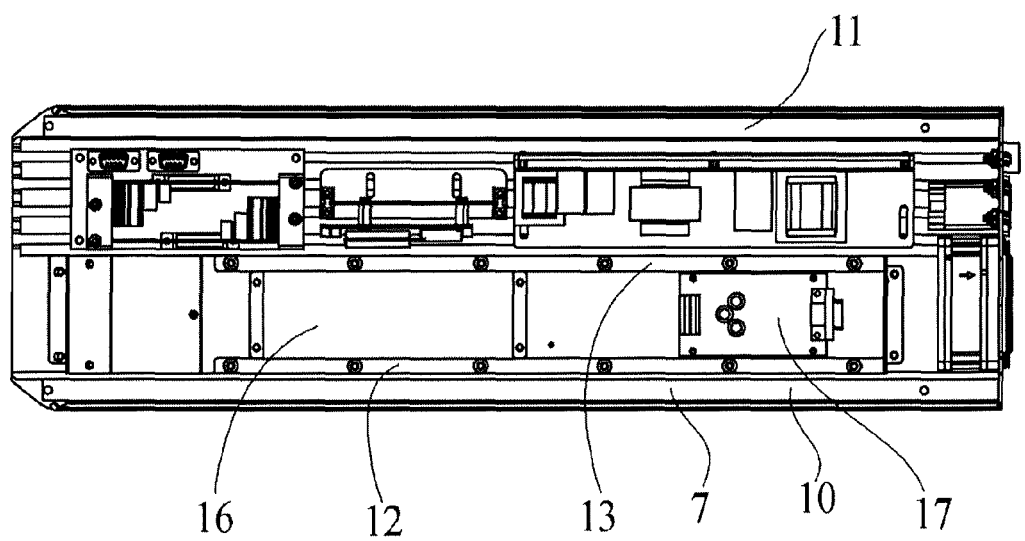
FIG. 8 shows a plan view of the apparatus with the upper lid removed.

FIG. 8 shows a plan view of the extruded base 7 in which can be seen the longitudinal side walls 10 and 11, intended to receive the closure lid, and also the longitudinal partition walls 12 and 13 intended to receive within them the laser generator cavity.

Figure 9:
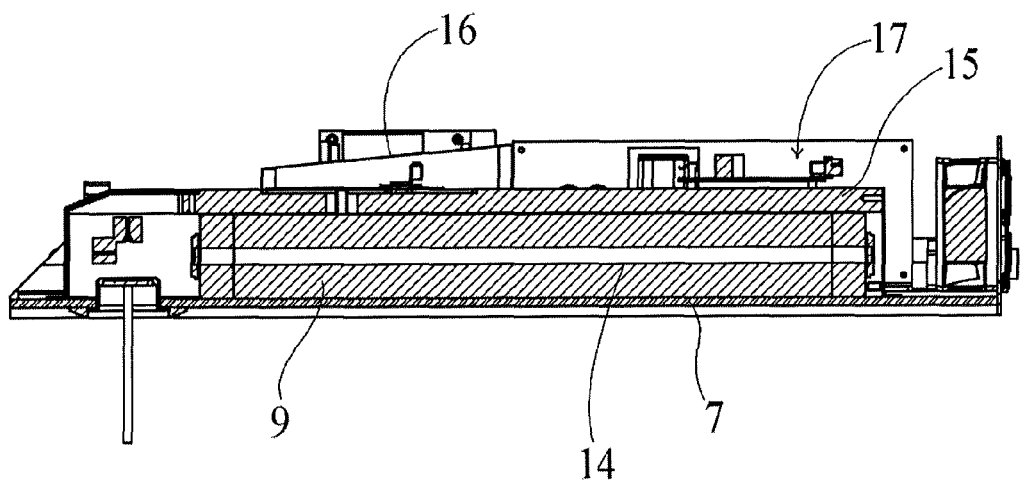
FIG. 9 shows a complete longitudinal section through the apparatus.
Figure 10:
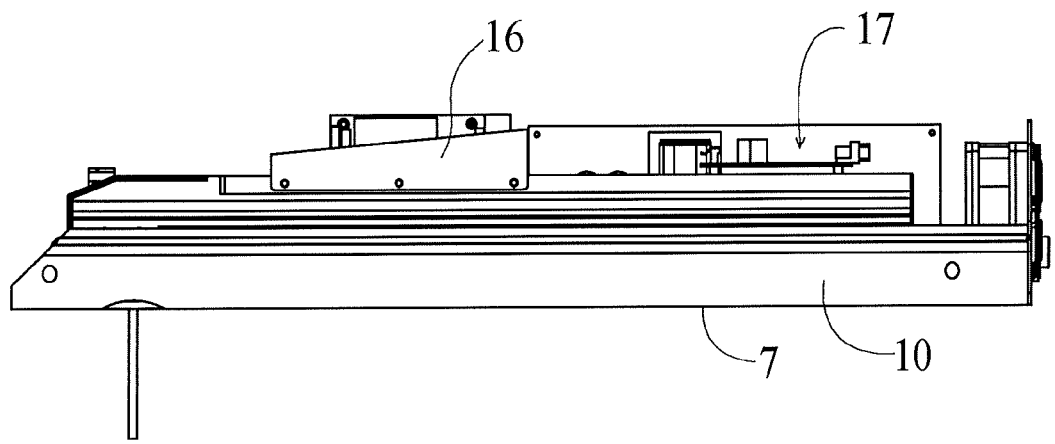
FIG. 10 shows a side elevation view of the apparatus without the upper lid.
Figure 11:
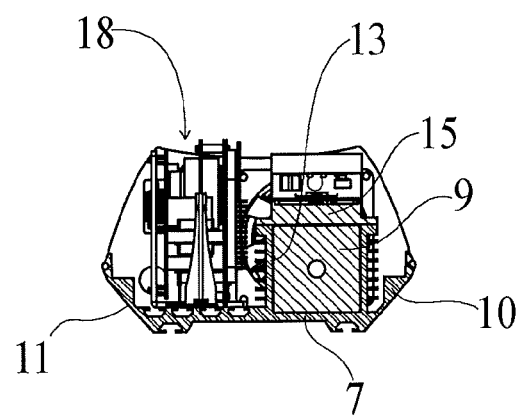
FIG. 11 shows a cross-section of the apparatus of FIG. 8.
Figure 12:
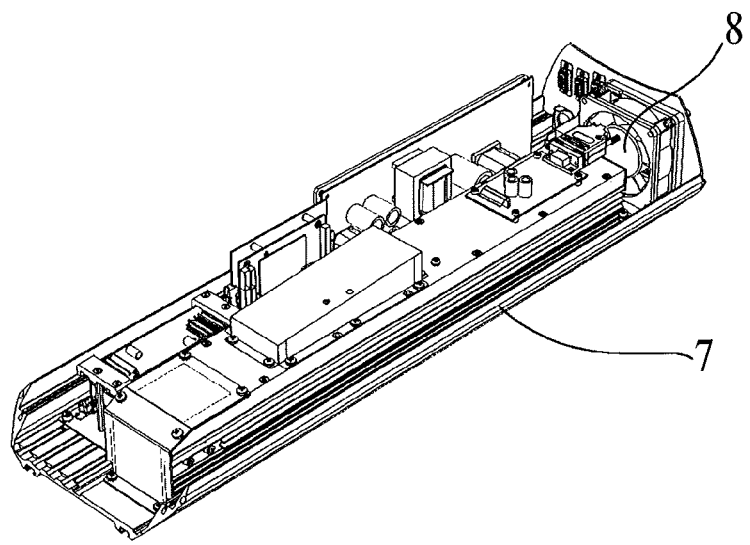
FIG. 12 shows a perspective view of the apparatus as a whole without the upper lid.

FIG. 9 shows a longitudinal section of the apparatus of FIG. 8, in which can be seen the arrangement of the laser cavity which contains what is termed the laser core with its axial aperture 14 and the optics in its ends, which have been represented very diagrammatically. On the partition walls 12 and 13 there is incorporated a lid 15 on which are directly incorporated the electronic assemblies 16 and 17. On the same main base 7, as can be seen in FIG. 11, the remainder of the electrical and electronic devices are incorporated in the area which is delimited between the intermediate partition wall 13 and the side wall 11. Said electrical and electronic devices have not been specified in detail and can be seen in both FIG. 8 and FIG. 11, in which they have been indicated overall by the number 18, as well as in FIG. 12, in which can be seen a complete perspective view of the laser apparatus without the outer lid.

By means of the apparatus of the present invention, the need to use mirrors and their supports or other optical systems for forming the optical path between the outlet mirror of the laser cavity and the lens for focusing the beam is eliminated, therefore in the apparatus in the one-piece version which has been shown there will be located on the one hand the RF source and electronic assemblies which may produce electromagnetic interference and which will be mounted inside a metal cage, and on the other hand the scanners, the CPU, control and display electronics, drivers for the scanners, and direct current supply source will be mounted on the extruded base and protected by the lid of synthetic material of the apparatus.

Figure 13:
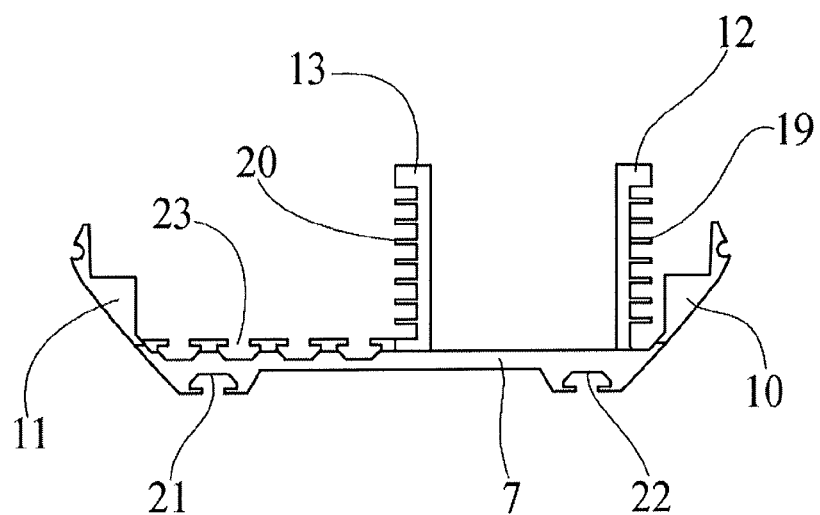
FIG. 13 shows a cross-section through the extruded base of the apparatus.

As shown in FIG. 13, a specific element of the present invention is formed by the base extruded from light alloy in one piece 7, which contains both the lower support base and the side walls 10 and 11 which are intended to receive the outer lid 2, as well as the partition walls 12 and 13 delimiting the chamber receiving the laser generator cavity. Said partition walls are equipped with multiple cooling fins 19 and 20. The extruded base 7 also has lower coupling grooves 21 and 22, as well as the series of grooves 23 in the area delimited between the partition wall 13 and the side wall 11, and which are intended to receive electrical and electronic accessory apparatuses of the laser device.

The RF source and electronics generating electromagnetic interference will be mounted inside a metal cage on the upper lid of the laser generator cavity, and the scanners, CPU, control and display electronics, drivers for the scanners, and direct current supply source will be coupled on the grooves of the extruded base between the intermediate partition wall limiting the chamber of the laser generator cavity and the opposite side wall of the extruded base for support of the lid of synthetic material of the apparatus. The terminal with touch screen will be mounted in the cover or lid.

The coupling of the laser generator cavity 9 in the extruded base 7 between the partition walls 12 and 13 is effected with the insertion of laminar spacers in the respective gaps 25 and 26 between the lateral faces of the cavity 9 and the abovementioned limiting partition walls 12 and 13. In the lower base of the cavity 9 another laminar spacer element is arranged, having similar characteristics. Said laminar spacer elements have high electrical and thermal conduction characteristics, as well as a good surface finish in order to allow improved contact. Their thickness will be variable, and may, in an example, be 0.1 mm. Their function aims to permit the expansion of the cavity 9 which will be greater than that of the structure of the extruded base, in order to avoid contact between the cavity and the limiting walls of said extruded base, for example 12 and 13, in order to avoid deformation of the cavity, which would affect the functioning of the laser device. Therefore the thickness of the spacer plates will be selected such that they can be smoothly introduced manually into the gaps 25 and 26, providing the maximum possible number of points of contact between the side walls of the cavity and the partition walls 12 and 13, and compensating for the expansion of the cavity 9, as already indicated.

Figure 14:
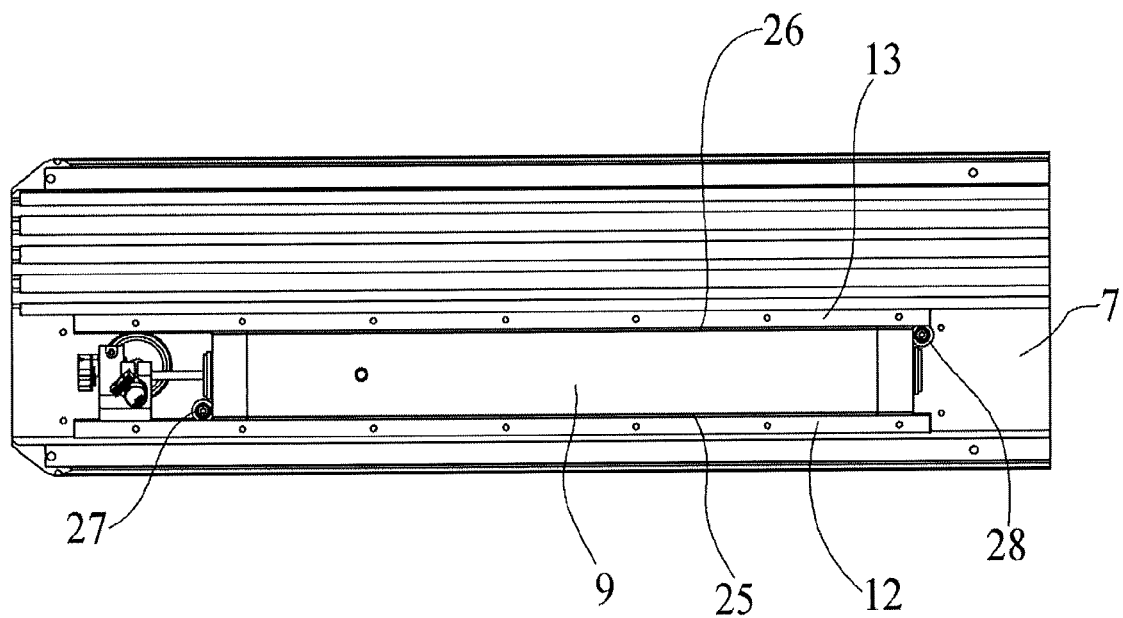
FIG. 14 shows a plan view of the extruded base with the laser generator cavity incorporated.

For the coupling of the cavity 9 between the partition walls 12 and 13 on the extruded base 7, coupled axial stops are arranged on said base 7, as can be seen in FIG. 14 in which the above-mentioned stops have been represented by the numbers 27 and 28. Said stops are preferably produced from an elastomeric material of suitable hardness to permit the stop function and avoid the transmission of vibrations.

Therefore, in this exemplary embodiment the apparatus will have, incorporated between the extruded base of light alloy and protected by the protective cover of synthetic material:

A laser cavity in the form of a self-contained unit that can be incorporated in the extruded base.

A radio-frequency source mounted with appropriate protection above the upper lid of the cavity.

An electronic control plate for the RF unit and for the laser cavity also incorporated on the lid of said laser cavity.

An electronic control plate for the RF source assembly and laser generator.

CPU for managing the software and general control of the equipment and user interface.

Direct current supply source.

User interface based on touch screen.

Galvanometric scanners.

Focusing optics.

Electronics for interconnection, display, protective sleeves, connectors, cabling and other electrical and mechanical equipment.

Although the invention has been described above on the basis of a preferred example and the appended drawings corresponding to said embodiment, it will be understood that persons skilled in the art, on receiving the information contained in the present description and drawings, may introduce numerous variants without departing from the scope of the present invention which is defined in the attached claims.

The invention claimed is:

1. A laser apparatus, comprising:
a base frame extruded in one single piece of light alloy metal and which determines a chamber intended to receive a laser generator cavity, incorporated within said chamber, the plane of a lower base of the laser generator cavity coinciding with the base plane of the extruded base, and lateral faces of the laser generator cavity being directed towards opposed lateral faces of partition walls of the extruded base, with controlled clearance between the laser generator cavity and the partition walls to permit the expansion of the laser generator cavity without mechanical stresses being produced on causing deformation to the laser generator cavity.

2. The laser apparatus according to claim 1, wherein the extruded base of the apparatus has a lower base equipped on its lower face with coupling grooves and laterally has walls intended to receive a lid for upper and lateral closure of the apparatus, as well as having respective longitudinal partition walls intended to delimit the chamber for the laser generator cavity.

3. The laser apparatus according to claim 2, wherein a lateral clearance between the laser generator cavity and the partition walls of the extruded base is controlled by means of laminar spacers of variable thickness which are intended to permit differential expansion of the cavity without stresses being produced on the cavity.

4. The laser apparatus according to claim 2, wherein the chamber of the cavity is formed by two flat partition walls which form part of the extruded base, which are arranged opposite each other and which, together with the base, form the chamber matched in shape to the laser generator cavity.

5. The laser apparatus according to the claim 1, wherein a lateral clearance between the laser generator cavity and the partition walls of the extruded base is controlled by means of laminar spacers of variable thickness which are intended to permit the-differential expansion of the cavity without stresses being produced on the cavity.

6. The laser apparatus according to claim 5, wherein the chamber of the cavity is formed by two flat partition walls which form part of the extruded base, which are arranged opposite each other and which, together with the base, form the chamber matched in shape to the laser generator cavity.

7. The laser apparatus according to claim 1, wherein the chamber of the cavity is formed by two flat partition walls which form part of the extruded base, which are arranged opposite each other and which, together with the base, form the chamber matched in shape to the laser generator cavity.

8. The laser apparatus according to claim 1, further comprising:

a lid of synthetic material which is incorporated directly on the side walls and front part of the extruded base and which delimits the upper and rear lateral faces of the apparatus.

9. The laser apparatus according to claim 1, wherein the chamber for the laser generator cavity is closed at the top by a lid fitted on the lateral partition walls of the extruded base and on the laser generator cavity, allowing electronic units of the laser apparatus to be received thereabove.

10. The laser apparatus according to claim 1, wherein the laser generator cavity is incorporated in the chamber defined by the partition walls of the extruded base and the base thereof with axial limitation by means of elastomer stops incorporated in the extruded base.

11. The laser apparatus according to claim 1, wherein the formation of an optical path between an outlet mirror of the laser cavity and a lens for focusing a beam of the laser apparatus obviates the need for other optical systems.

12. The laser apparatus according to claim 1, wherein a source of RF and electronics generating electromagnetic interference are mounted inside a metal cage on the upper lid of the laser generator cavity, and scanners, CPU, electronics for control and display, drivers for the scanners, and direct current supply source are coupled on grooves of the extruded base between the intermediate partition wall limiting the chamber of the laser generator cavity and the opposed lateral wall of the extruded base for supporting the lid of synthetic material of the apparatus and the terminal with touch screen is comprised in the lid.

* * * * *